UNITED STATES PATENT OFFICE.

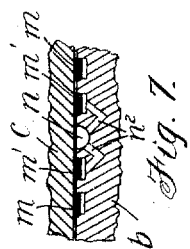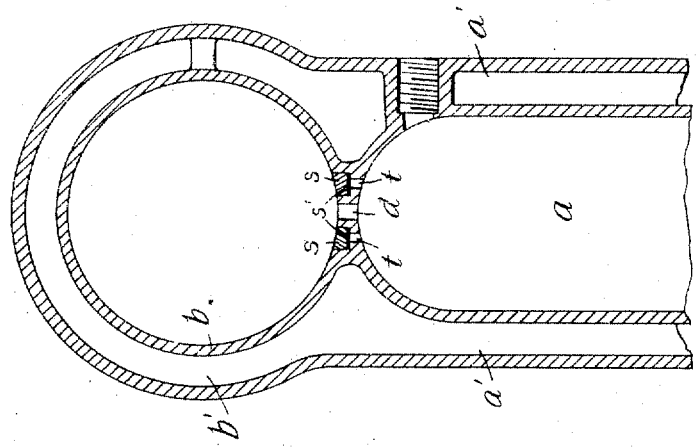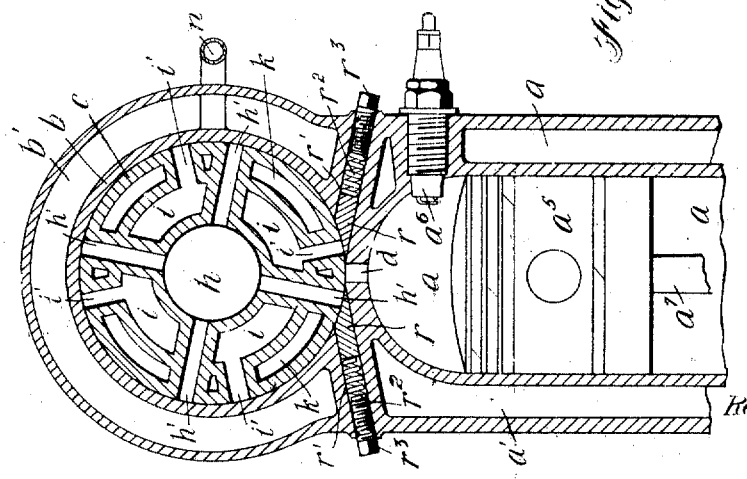

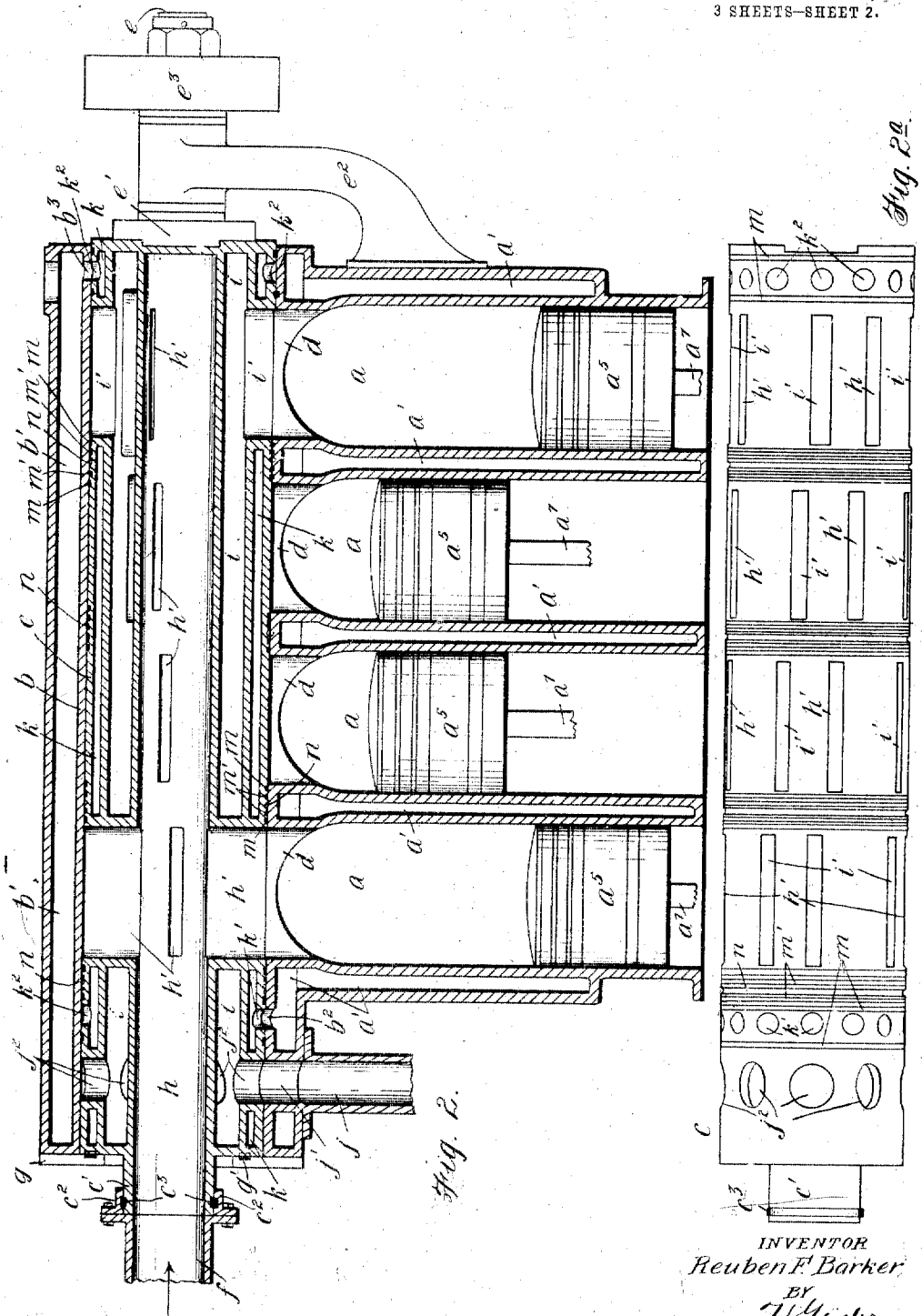

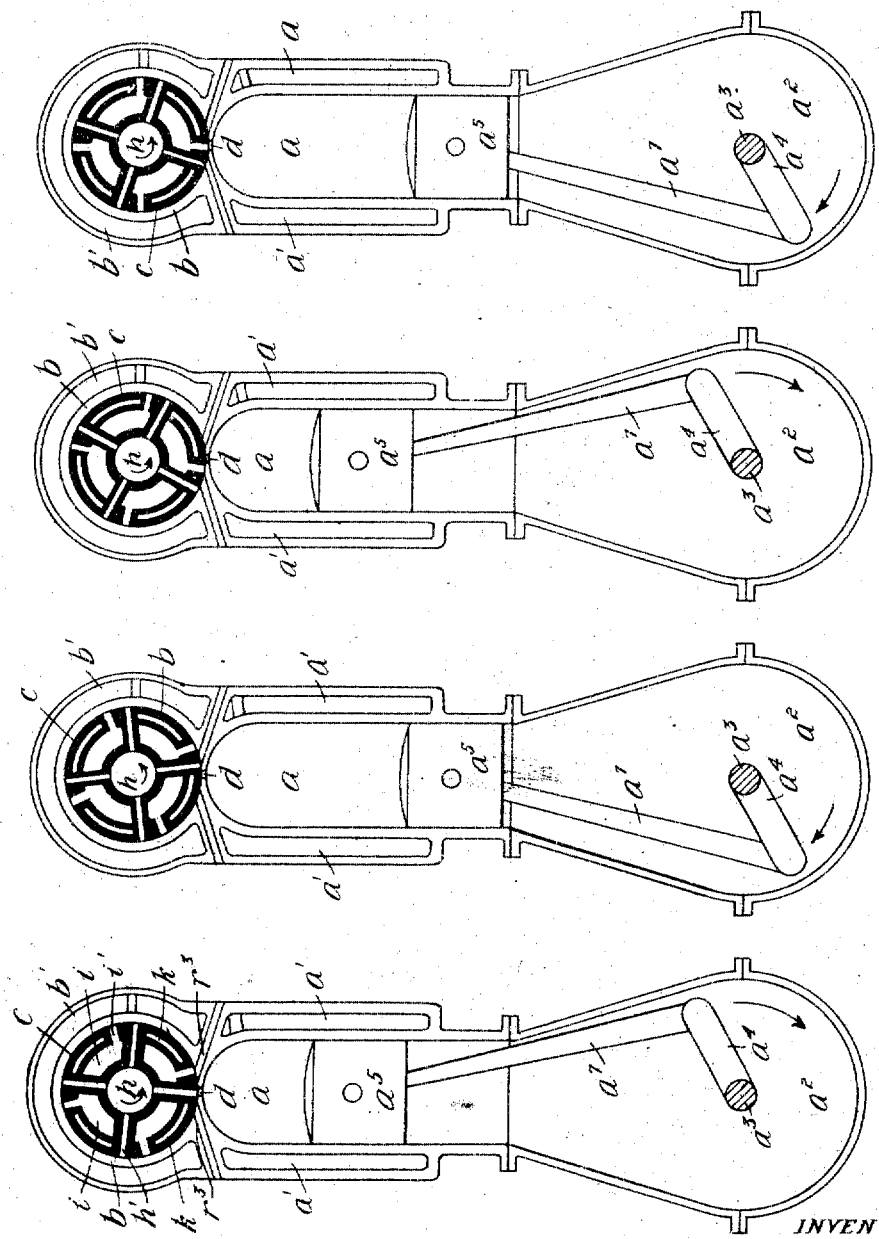

RUBEN F. BARKER, OF PORTLAND, OREGON.

ROTARY VALVE FOR EXPLOSIVE-ENGINES.

1,251,953.

Specification of Letters Patent. Patented Jan. 1, 1918.

Application filed September 17, 1915. Serial No. 51,499.

*To all whom it may concern:*

Be it known that I, RUBEN F. BARKER, a citizen of the United States, and resident of Portland, county of Multnomah, State of Oregon, have invented a new and useful Improvement in Rotary Valves for Explosive-Engines, of which the following is a specification.

This invention relates generally to explosive engines, and has particularly to do with rotary valve mechanism used in connection therewith. In a gas engine, the intense heat generated by the continuous explosions in the cylinders, has a tendency to distort the valve from its true cylindrical form. The consequent result of this condition is excessive leakage of gases, and loss of compression in the cylinders.

One of the main objects of my invention is to provide a rotary valve in which the valve body will be prevented from undue expansion due to heat, and which will be maintained at all times in fluid-tight contact with the walls of the valve chamber.

Another of the main objects of my invention is to provide a rotary valve which will be made with a plurality of inlet and exhaust ports for each cylinder, and which may therefore be driven at a comparatively low speed.

Still another of the objects of my invention is to provide a valve in which the inlet conduit will be encompassed by the exhaust conduit, and the heated gases passing through the latter will heat and gasify the incoming vapors in the inlet conduit.

Still another of the main objects of my invention is to provide means for preventing leakage of gases from one cylinder to another, or around the valve body.

Features of my invention which are important include the means by which a constant circulation through the water-jacket of the valve body is maintained; the means by which the inlet and exhaust conduits are maintained in constant communication with the inlet and exhaust manifolds; and the construction of the valve and its associated parts which makes it a comparatively simple structure, low in cost of manufacture and maintenance, and capable of great flexibility in the manner of assembling and driving.

All of the details of my invention are fully shown in the accompanying drawings, in which, Figure 1 is a transverse, vertical sectional view through the valve and corresponding cylinder illustrating particularly the arrangement of the water jackets of my valve and its chamber;

Fig. 1ª is a sectional view showing an alternate detail of construction.

Fig. 2 is a longitudinal, vertical section showing the cylinders of a four-cycle gas engine with my rotary valve incorporated therewith;

Fig. 2ª is an elevation of the valve, by itself.

Figs. 3, 4, 5, and 6, are transverse, vertical sections, in diagram form showing the positions of the valve during consecutive strokes in the cycle of operation; and Fig. 7 is a detail of construction.

In the accompanying drawings, my invention is shown incorporated in a four-cycle gas engine type. The engine cylinders are represented by $a$, and their water-jacket by $a'$. $a^2$ is the crank case of the engine, $a^3$ is the crank shaft, $a^4$ is an arm of such shaft, $a^5$ the pistons, $a^6$ the spark plug, $a^7$ the piston rods. The upper portion of the engine is formed into a water-jacketed, cylindrical, valve chamber $b$, the water-jacket of which is indicated by $b'$, and the rotary valve body $c$ is mounted within said chamber $b$. The longitudinal axis of the valve chamber $b$ is located in the common vertical plane of the cylinder axes. In the upper end of each cylinder is a single port $d$ connecting the cylinder with the valve chamber $b$, and the ports of the valve are adapted to register with the cylinder ports $d$ at predetermined intervals during the rotation of the valve. The cylinder water-jacket $a'$ is also provided with ports $b^2$ and $b^3$, located substantially as shown in Fig. 2.

The valve body is cylindrical in shape and is adapted to be rotated freely in the valve chamber. One end of said valve body is closed, and is connected to a driving shaft $e$, by an Oldham coupling $e'$ (see Fig. 2). Said shaft $e$ is mounted in a bracket $e^2$ and is provided with a driving element $e^3$ by means of which power from the engine shaft $a^3$, is transmitted to the valve body. Said drive may be geared down so as to rotate the valve at slow speed. In the illustrations, the valve is adapted to make one revolution for every four complete cycles of the engine.

The other end of the valve body $c$ is an open cylindrical hub $c'$. Mounted on this hub is a loose collar $c^2$, said collar being relatively rotatable on the hub by means of the packing ring $c^3$. The inlet manifold $f$ is fixed to the collar $c^2$, and the carbureter, which is not shown herein, is connected directly to this inlet manifold. The valve $c$ is maintained in the chamber $d$, by the flange $g$, and the packing ring $g'$.

The construction of the valve is as follows: Coincident with the longitudinal axial line of the valve body is an inlet conduit $h$ extending the entire length of the body and connecting directly with the exterior of the latter by the inlet ports $h'$. These latter are adapted to be brought into registration with the cylinder ports $d$ by the rotation of the valve. The inlet conduit $h$ is closed at one end and its other end terminates in the open hub $c'$ as previously mentioned.

Concentric with, and encompassing the inlet conduit is the exhaust conduit $i$. Said exhaust conduit $i$ is provided with a plurality of exhaust ports $i'$ which connect directly with the exterior of the valve and are adapted to be brought into registration with the ports $d$ of the cylinder by the rotation of the valve. An exhaust manifold $j$ is affixed to the engine and has a port $j'$ connecting with the valve chamber $h$. A plurality of ports $j^2$ arranged in the same vertical plane with the port $j'$ connect the exhaust conduit with the exterior of the valve body and said ports register successively with the port $j'$ during the rotation of the valve, and form the means for exhausting the burnt gases from the exhaust conduit.

Concentric with and encompassing the exhaust conduit $i$ is a water-jacket $k$. Said water-jacket $k$ is provided with a plurality of ports $k'$ and $k^2$ arranged in vertical planes at opposite ends of the valve body. During the rotation of the valve body, the ports $k'$ and $k^2$ will register with the ports $b^2$ and $b^3$ respectively. In this way, the circulation through the water-jacket $k$ of the valve body is maintained.

As a means for preventing leakage from one cylinder to the other, the packing rings $m$ and $m'$ are positioned as shown in Fig. 2, and oil grooves $n$ running entirely around the valve body are kept full of oil under constant pressure. The oil under pressure is carried by the conduit $n'$ shown in Fig. 1, the source of pressure being omitted. As a means for insuring the expansion of the packing rings $m'$, which are located adjacent the oil grooves $n$, ducts $n^2$ are drilled which connect said oil grooves with the ring groove. (See Fig. 7). In this way, the oil pressure is exerted so as to expand the rings $m'$.

As a means for preventing leakage around the periphery of the valve body, the packing members $r$ are used. (See Fig. 1.) These members are slidably mounted on opposite sides of the cylinder ports $d$, in bearings $r'$ of the cylinder walls, and their inner faces are concaved to conform with the curvature of the valve body $c$. Said members are held up against the rotating valve by expansion coil springs $r^2$, the expansion of which may be adjusted by means of the screws $r^3$. In this way, should there be any tendency toward leakage past the valve, these members bearing tightly against the valve body will prevent such leakage. Furthermore, said members grind themselves at all times and any wear is compensated for by the spring expansion.

An alternate construction shown in Fig. 1$^a$ may be substituted for the last mentioned feature and this construction consists in the use of horizontal packing plates $s$ parallel with the cylinder port $d$ and on opposite sides thereof. Said plates $s$ have upper concaved faces which bear on the valve body, and a flat spring $s'$ placed under each plate has a tendency to thrust said plate up against the valve.

Ports $t$ connect the lower faces of the plates $s$, with the interior of the cylinders, and during the compression and explosion strokes of the engine, said plates $s$ will be more strongly thrust up against the valve body so as to maintain a tight joint on either side of the port $d$.

I claim:

1. In a gas engine having water-jacketed cylinders, a cylindrical valve chamber, a port connecting said valve chamber and cylinder, a water-jacketed rotary valve mounted in said valve chamber, said valve comprising concentric inlet and exhaust conduits, a water-jacket encompassing the latter, and valve ports connecting said conduits with the exterior of the valve, adapted to be brought into registration with the cylinder port by the rotation of the valve.

2. In a gas engine having water-jacketed cylinders, a water-jacketed cylindrical valve chamber, a port connecting said valve chamber and cylinder, a water-jacketed rotary valve mounted in said valve chamber, said valve comprising concentric inlet and exhaust conduits, a water-jacket encompassing the latter, valve ports connecting said conduits with the exterior of the valve, adapted to be brought into registration with the cylinder port by the rotation of the valve, and means for maintaining the water-jacket of the valve in constant communication with the water-jacket of the cylinders.

3. In a gas engine having water-jacketed cylinders, a water-jacketed cylindrical valve chamber, a port connecting said valve chamber and cylinder, a water-jacketed rotary valve mounted in said valve chamber, said valve comprising concentric inlet and exhaust conduits, a water-jacket encompassing the latter, valve ports connecting said conduits with the exterior of the valve, adapted to be brought into registration with the cylinder port by the rotation of the valve, and registering ports for maintaining the water-jacket of the valve in constant communication with the water-jacket of the cylinders.

4. In a gas engine having water-jacketed cylinders, valve mechanism comprising a water-jacketed cylindrical valve chamber a port connecting said valve chamber and cylinder, a water-jacketed rotary valve mounted in said valve chamber, said valve comprising concentric inlet and exhaust conduits, a water-jacket encompassing the latter, valve ports connecting said conduits with the exterior of the valve, adapted to be brought into registration with the cylinder port by the rotation of the valve, an exhaust manifold, means for maintaining the exhaust conduit of the valve in constant communication with the exhaust manifold, an inlet manifold, means for maintaining the inlet conduit in constant communication with the inlet manifold, and means for maintaining the water-jacket of the valve in constant communication with the water-jacket of the cylinders.

5. In a gas engine having water-jacketed cylinders, valve mechanism comprising a water-jacketed cylindrical valve chamber, a port connecting said valve chamber and cylinder, a water-jacketed rotary valve mounted in said valve chamber, said valve comprising concentric inlet and exhaust conduits, a water-jacket encompassing the latter, valve ports connecting said conduits with the exterior of the valve, adapted to be brought into registration with the cylinder port by the rotation of the valve, an exhaust manifold, registering ports for maintaining the exhaust conduit of the valve in constant communication with the exhaust manifold, an inlet manifold, and means for maintaining the inlet conduit in constant communication with the inlet manifold, and registering ports for maintaining the water-jacket of the valve in constant communication with the water-jacket of the cylinders.

6. A valve for internal combustion engines consisting of a rotary valve tube having a central longitudinal gas intake passage, an intermediate exhaust passage surrounding said intake passage and a continuous, longitudinal cooling medium passage surrounding said exhaust passage.

RUBEN F. BARKER.